United States Patent [19]

Grochowski

[11] Patent Number: 5,226,517
[45] Date of Patent: Jul. 13, 1993

[54] CLUTCH ASSEMBLY

[75] Inventor: Edwin T. Grochowski, Howell, Mich.

[73] Assignee: General Motors Corporation, Detroit, Mich.

[21] Appl. No.: 942,919

[22] Filed: Sep. 10, 1992

[51] Int. Cl.$^5$ ............ F16D 25/063; F16D 25/14
[52] U.S. Cl. ............ 192/85 AA; 192/70.2; 192/106 F
[58] Field of Search ........ 192/85 AA, 106 F, 109 F, 192/70.11, 70.2, 70.28

[56] References Cited

U.S. PATENT DOCUMENTS

| | | | |
|---|---|---|---|
| 2,795,309 | 6/1957 | Hasbany | 192/85 AA |
| 2,804,780 | 9/1957 | Gerst | 192/85 AA X |
| 3,016,121 | 1/1962 | Mosbacher | 192/85 AA X |
| 3,047,115 | 7/1962 | Lee et al. | 192/85 AA |
| 3,282,385 | 11/1966 | Snyder | 192/85 AA |
| 3,285,379 | 11/1966 | Helquist | 192/85 AA |
| 3,370,682 | 2/1968 | McFarland | 192/85 AA |
| 3,545,583 | 12/1970 | Cieszewski et al. | 192/85 AA |
| 3,814,226 | 6/1974 | White | 192/85 AA |
| 4,425,994 | 1/1984 | Schele | 192/85 AA |
| 4,509,627 | 4/1985 | Kawamoto | 192/106 F X |
| 4,635,778 | 1/1987 | Lederman | 192/85 AA |
| 4,724,941 | 2/1988 | Wirkner | 192/109 F X |
| 4,805,752 | 2/1989 | Malloy et al. | 192/85 AA |
| 4,864,891 | 9/1989 | Takano et al. | 192/85 AA |
| 4,917,002 | 4/1990 | Pociask | 192/85 AA X |
| 4,944,376 | 7/1990 | Ozaki et al. | 192/17 A |
| 4,957,195 | 9/1990 | Kano et al. | 192/106 F |

Primary Examiner—Leslie A. Braun
Assistant Examiner—Andrea Pitts
Attorney, Agent, or Firm—Donald F. Scherer

[57] ABSTRACT

A clutch assembly has a hub and a piston interlaced to provide an operating chamber for the piston. A plurality of friction plates are in alternate drive connection with the hub and a housing surrounding the hub, and are engaged by the piston when the chamber is pressurized to establish a friction torque transmitting connection between the hub and the housing.

3 Claims, 2 Drawing Sheets

CLUTCH ASSEMBLY

TECHNICAL FIELD

This invention relates to fluid operated friction torque transmitting devices, and more particularly, to such devices having an axially moving piston for engaging a plurality of friction plates.

BACKGROUND OF THE INVENTION

Fluid operated multi-disc type friction torque transmitting devices have a piston slidably disposed in a housing and cooperating therewith to form a chamber. The chamber is generally axially aligned with a multiplate disc pack and therefore additive to the overall axial length requirement of the torque transmitting device. While the performance of the torque transmitting device is not affected by this structure, the overall axial length may prevent the use of some transmission structures in vehicles where space is limited.

SUMMARY OF THE INVENTION

The present invention reduces the axial space requirement of multi-plate fluid operated torque transmitting devices by providing an interlaced hub and piston, wherein the fluid chamber is disposed radially inward of and radially aligned with the friction plates.

It is therefore an object of this invention to provide an improved fluid operated multi-plate friction torque transmitting device having a minimum axial spaced requirement.

It is another object of this invention to provide an improved fluid operated multi-plate friction torque transmitting device having an interlaced piston and hub structure for providing a device operating chamber radially inward of the friction plates.

It is another object of the present invention to provide an improved fluid operated friction torque transmitting device having a fenestrated piston interlaced with a hub having appendages extending through the fenestrae and providing a drive connection in the space between the adjacent fenestra for a plurality of friction plate members which are alternately spaced with friction plate members having a drive connection with the housing, and wherein the piston has an annular apply surface intermediate the housing and the hub for enforcing frictional engagement of the plates in response to fluid pressure admitted to the chamber formed through cooperating portions of the hub and the piston.

These and other objects and advantages of the present invention will be more apparent from the following description and drawings.

DESCRIPTION OF THE EMBODIMENT

Figure 1:
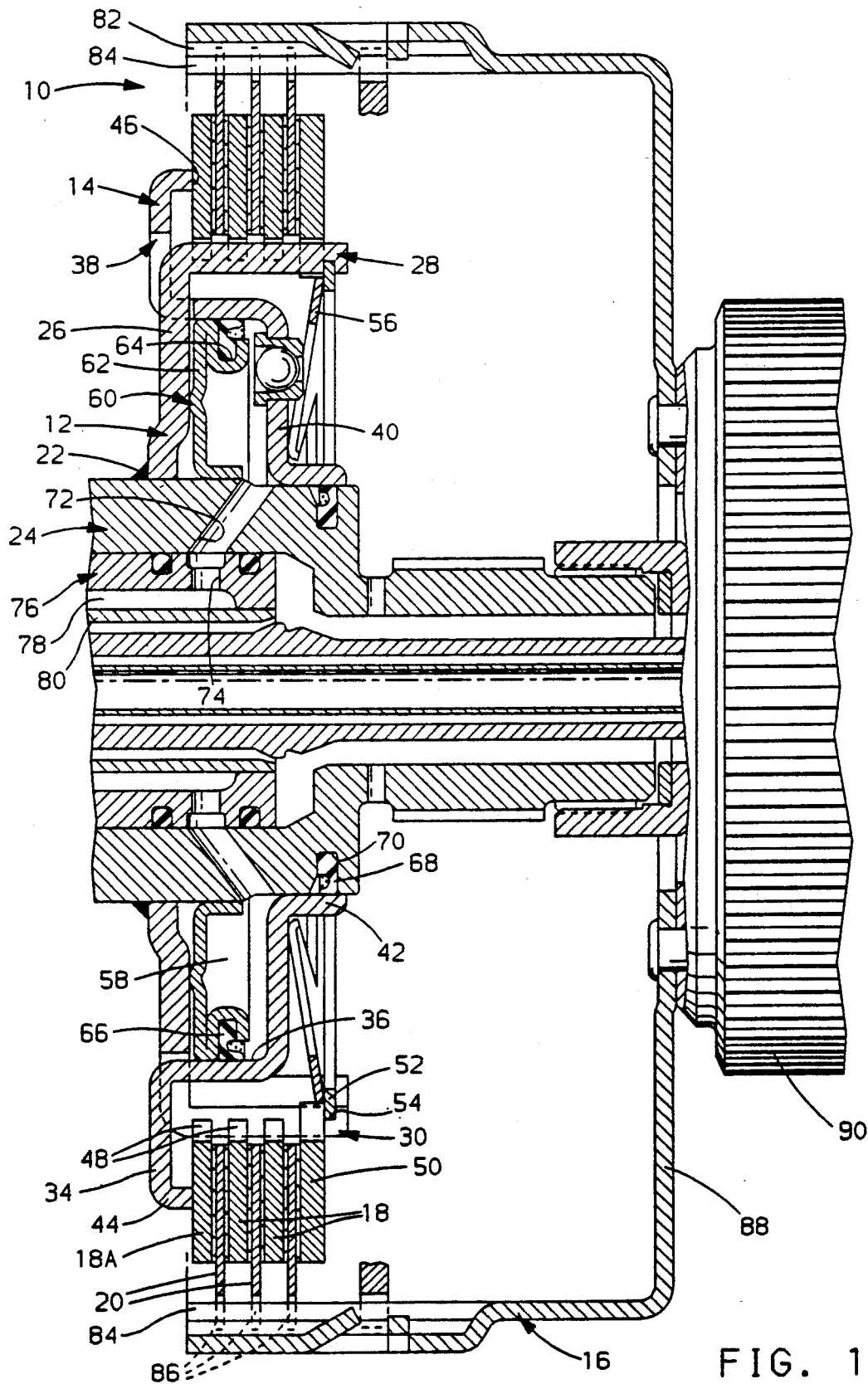
FIG. 1 is a cross-sectional elevational view of a torque transmitting friction device, such as a clutch, incorporating the present invention.

Referring to the drawings, wherein like characters represent the same or corresponding parts throughout the several views, there is seen in FIG. 1 a clutch assembly, generally designated 10, which includes an annular hub 12, an annular piston 14, an annular housing 16, a plurality of friction plates 18 drivingly connected with the hub 12 and alternately spaced with a plurality of friction plates 20 drivingly connected with the housing 16.

Figure 2:
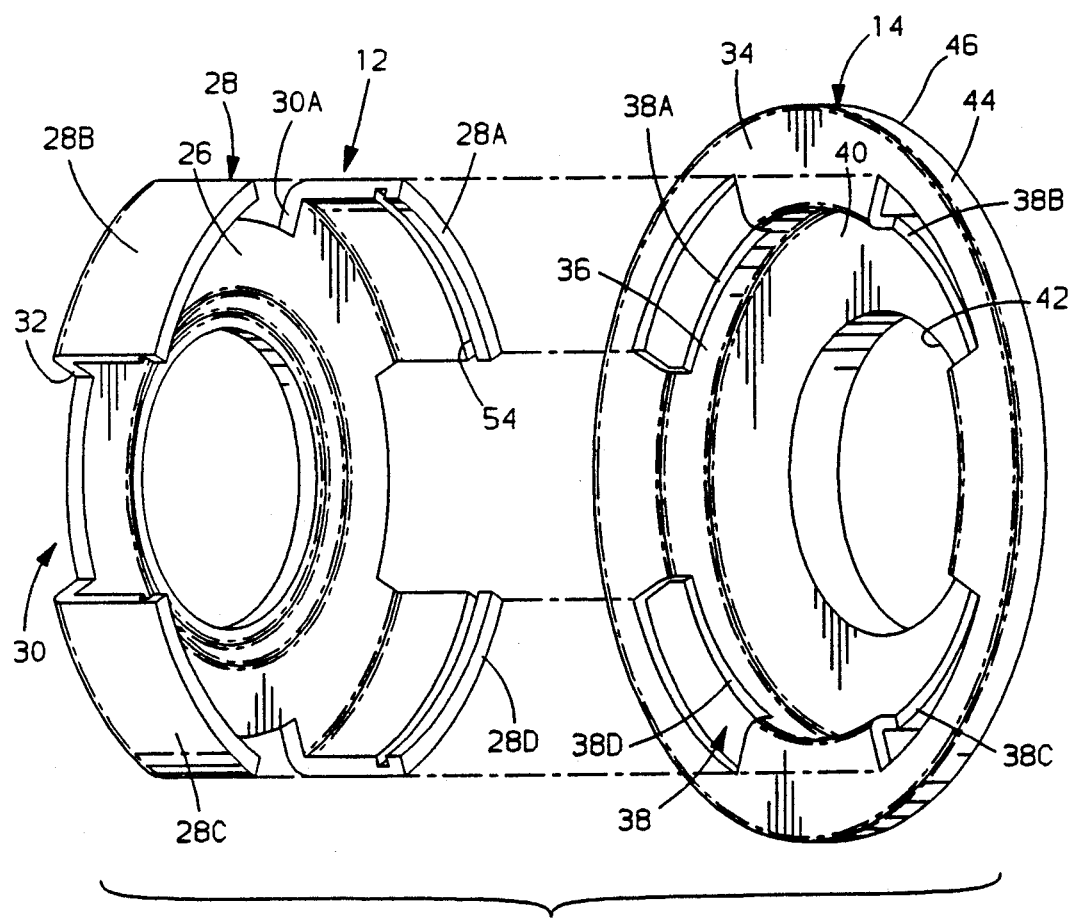
FIG. 2 is an exploded view of the piston and hub incorporated in the present invention.

The hub 12 is secured, as by welding at 22, to a rotatable shaft 24 which may provide a rotary input for a transmission. The hub 12 has, as best seen in FIG. 2, an annular end wall 26 from which axially extends a plurality of fingers 28. The fingers 28 are separated by slots 30 which extend radially, as at 32, into the annular end wall 26. The slots 30 separate adjacent finger portions, as for example, slot 30A separates finger portions 28A and 28B (FIG. 2).

In the detailed description which follows, and as previewed in the previous paragraph, a particular structural member, component or arrangement, may be employed in more than one location. When referring generally to that type of structural member, component or arrangement, a common numerical designation shall be employed. However, when one structural member, component or arrangement so identified, is to be individually identified, it shall be referred to as a letter suffix in combination with the numerical designation employed for general identification of that structural member, component or arrangement. Thus, there are at least four laterally spaced fingers which are generally identified by the numeral 28. But the specific individual fingers are therefore identified as 28A, 28B, etc., in the specification and on the drawings. This same suffix convention will be employed throughout the specification.

The piston 14 has an annular end wall 34 and an axially extending annular sealing surface 36. The annular end wall 34 has a plurality of apertures or fenestrae 38. A second annular end wall 40 is formed between the annular sealing surface 36 and an inner support surface 42. The annular end wall 34 terminates in an axially extending lip or presser plate portion 44, which has an annular end face 46 which defines a surface for engaging the friction plate 18A.

The fingers 28, during assembly of the clutch 10, are inserted through the apertures 38, such that finger 28A passes through aperture 38A, finger 28B passes through aperture 38B, finger 28C passes through aperture 38C and finger 28D passes through aperture 38D. The fingers 28, after passing through the respective apertures, will present slots 30, formed between adjacent fingers 28, for engagement by spline members 48 formed on the inner periphery of the plates 18. The plates 18 are limited in movement in the slots 30 in one direction by a backing plate 50, which is also splined in the slots 30. The backing plate 50 is maintained in position in one direction by a locking ring 52 which is disposed in a locking groove 54 which, except for the slots 30, forms an annular slot in the fingers 28. The locking ring 52 also serves as an outer stop member for a conventional Belleville or diaphragm spring 56. The inner portion of the diaphragm spring 56 is in abutment with the annular wall 40 of the piston 14 to urge the piston toward the hub 12.

Intermediate the annular wall 40 of the piston 14 and the annular wall 26 of the hub 12 is formed a chamber 58. Disposed within the chamber 58 is a seal assembly 60 comprised of an annular sheet metal stamping 62, which presents an outwardly opening seal groove 64 in which is disposed a conventional lip seal 66. The lip seal 66 abuts the seal surface 36 of the piston 14 so as to provide a substantially leak proof interface therebetween. The support surface 42 also cooperates with a lip seal 68 which is disposed in a groove 70 formed in the shaft 24. Thus, the chamber 58 is substantially leak proof such that the only pathway for fluid to enter or leave the chamber 58 is via a passage 72 formed in the shaft 24.

The passage 72 is communicated with a radial passage 74 formed in a support sleeve 76. The passage 74 receives fluid through an annular chamber 78 formed between the support 76 and a sleeve 80. This is a conventional assembly for supplying fluid to or exhausting fluid from the rotating clutch member.

The housing 16 is preferably a sheet metal component, however, other materials can be utilized. The housing 16 has an annular outer structure 82 in which is rolled or otherwise formed a spline 84. The spline 84 is adapted to engage splines or toothed components 86 which are formed on the outer periphery of the friction plates 20. Thus, a drive connection is provided between the housing 16 and the plates 20. The housing 16 has an output or annular hub 88 which is drivingly connected to a gear member 90 which forms part of a gear structure within a transmission.

When fluid pressure is admitted to the chamber 58, the piston 14 will be urged rightward, as viewed in FIG. 1, against the force in spring 56, such that the end face 46 will cause the friction plates 18 to frictionally engage the friction plates 20, since rightward movement thereof is limited by the plate 50. When sufficient pressure is present in the chamber 58, the frictional engagement between the plates 18 and 20 will result in substantially unitary rotation between the shaft 24 and the housing 16. This will provide a conventional rotary type or rotating type clutch mechanism.

In the alternative, it should be appreciated that the housing 16 and/or the shaft 24 can be connected to a stationary member, such as a transmission housing, in which case, the engagement of the piston 14 with the friction plates 18 and 20 would result in holding the gear member or shaft stationary, thereby providing a brake structure within a transmission.

As best seen in FIG. 1, the chamber 58 is radially aligned and axially aligned with the friction plates 18 and 20, such that the overall axial length of the clutch assembly 10 is maintained at a minimum when compared to fluid operated friction torque transmitting assemblies wherein the engagement or control chamber is substantially axially aligned but radially offset from the respective friction plates. Typical friction devices incorporating the axially aligned structure can be seen in U.S. Pat. No. 5,009,116, issued to Ordo et al., Apr. 23, 1991, and assigned to the assignee of the present invention, or U.S. Pat. No. 4,635,778, issued to Lederman, Jan. 13, 1987, and assigned to the assignee of the invention. The Lederman patent discloses both a clutch and a brake utilizing the axially aligned chamber and friction plates.

The embodiments of the invention in which an exclusive property or privilege is claimed are defined as follows:

1. A multi-plate fluid operated friction device comprising:
    an outer housing member having a splined inner periphery;
    an inner hub member having annular end wall means and a plurality of axially extending, equiangularly spaced fingers presented axially from the end wall means;
    piston means having inner end wall means cooperating with the annular end wall means to define a fluid chamber, outer end wall means including a plurality of apertures aligned with the respective ones of the spaced fingers, and a continuous presser plate surface, whereby the inner end wall means is radially inward of the fingers and the pressure plate wall is radially outward of the fingers, said apertures and fingers permitting said piston means to pass radially through said inner hub member; and
    a plurality of plate means disposed between the fingers and the splined periphery with alternate ones of the plate means being drivingly connected between the fingers and to the splined inner periphery.

2. The multi-plate fluid operated device defined in claim 1 wherein the fluid chamber is disposed substantially radially inward of the plate means.

3. The multi-plate fluid operated device in claim 1 further wherein said piston including an axially extending sealing wall interconnecting said inner end wall means and said outer end wall means; and a seal assembly means for providing a seal cooperating with the axially extending sealing wall to define the fluid chamber at a location radially inward of and substantially axially aligned with the plate means.

* * * * *